Nov. 1, 1949.    C. J. RIDGLEY    2,486,613
TWO-ARMATURE SELECTIVELY RETARDED ELECTROMAGNET
Filed Oct. 19, 1945    6 Sheets-Sheet 1

TYPICAL AIR CIRCUIT BREAKER

CURVE 1  100 AMP WITH 15000A INTER.
CURVE 2  600 AMP WITH 25000A INTER.
CURVE 3  1200 AMP WITH 50000A INTER.
CURVE 4  2000 AMP WITH 75000A INTER.

Fig. 2

CURRENT IN AMPERES

Fig. 1

INVENTOR.
Cornelius J. Ridgley
BY Ostrolenk & Faber
Attorneys.

Nov. 1, 1949.                C. J. RIDGLEY                2,486,613
              TWO-ARMATURE SELECTIVELY RETARDED ELECTROMAGNET
Filed Oct. 19, 1945                              6 Sheets-Sheet 2

Fig. 3

INVENTOR.
CORNELIUS J. RIDGLEY
BY
Ostrolenk + Faber
ATTORNEYS

INVENTOR.
Cornelius J. Ridgley

Nov. 1, 1949.   C. J. RIDGLEY   2,486,613
TWO-ARMATURE SELECTIVELY RETARDED ELECTROMAGNET
Filed Oct. 19, 1945   6 Sheets-Sheet 5

INVENTOR.
CORNELIUS J. RIDGLEY
BY Ostrolenk + Faber
ATTORNEYS

Nov. 1, 1949.  C. J. RIDGLEY  2,486,613
TWO-ARMATURE SELECTIVELY RETARDED ELECTROMAGNET
Filed Oct. 19, 1945  6 Sheets-Sheet 6

Fig. 8

INVENTOR.
CORNELIUS J. RIDGLEY
BY
Ostrolenk + Faber
ATTORNEYS

Patented Nov. 1, 1949

2,486,613

UNITED STATES PATENT OFFICE 2,486,613

TWO-ARMATURE SELECTIVELY RETARDED ELECTROMAGNET

Cornelius J. Ridgley, Philadelphia, Pa., assignor to I. T. E. Circuit Breaker Company, Philadelphia, Pa., a corporation of Pennsylvania Application October 19, 1945, Serial No. 623,384

5 Claims. (Cl. 175—372)

1

My invention relates to circuit breakers and more specifically to novel tripping devices therefor adapted to be used in a system of circuit breakers arranged for sequential tripping over the entire protective range of the circuit breakers including the short circuit current ranges.

More specifically, my invention relates to a novel tripping device provided with direct acting overload elements which may be adjusted to secure sequential tripping with respect to other breakers in the system.

In distribution systems within, for instance, a large industrial plant, the power enters the plant through a main circuit breaker to the main distribution switchboard and is there fed out on a number of feeder circuits each protected by a circuit breaker. These feeders may each go to large loads. Some, or all, however, may go to additional distribution switchboards where they are again divided into smaller distribution circuits. Each of these circuits may in turn go to load centers or power panels for distribution of the energy to a multiplicity of loads.

Distribution systems of this type (of which a simplified diagrammatic illustration is hereinafter shown in the figures) are utilized not only in most industrial plants, but also wherever a large quantity of apparatus in a relatively compact unit must be operated from a central power source.

In such distribution systems, the fault current due to fault or short circuit conditions in one of the feeder circuits, or even in one of the load circuits, passes through several breakers in series and may result not merely in a tripping of the circuit breaker protecting that particular load, but in a tripping of each of the circuit breakers back of and in series with that particular circuit breaker back to the source—so that one of the main feeder breakers, or even the main breaker itself, may be tripped and thus disconnect the entire distribution system.

Accordingly the primary problem to which this invention is directed is the construction and arrangement of such circuit breakers in a distribution system in such a novel manner that high speed selective tripping will occur, and so that the circuit breaker nearest the fault will be operative to clear an over-current, fault, or short circuit condition on the particular circuit it is protecting before the circuit breakers between it and the source can complete a tripping operation, and so that each circuit breaker in the system will be protected by the circuit breaker immediately behind it toward the source.

2

More specifically, I have invented a novel tripping device peculiarly adapted for use in a system in which the overload mechanisms of the circuit breakers in the system are so adjusted that the smallest circuit breakers for protecting the individual loads have a higher speed trip characteristic than other breakers in series with them up to their maximum interrupting capacity. At or below maximum interrupting capacity of these load breakers, the adjustment of the overload mechanism of the adjacent circuit breaker in series with the load unit breaker (toward the source) becomes quick acting to trip its associated circuit breakers quickly and therefore protects the smaller load breaker. The overload mechanism of this adjacent circuit breaker is in turn adjusted to trip its associated breaker faster than the next circuit breaker (toward the source) in the series circuit thereby preventing tripping of this next circuit breaker at short circuit values approximately up to or below the maximum interrupting capacity of the preceding circuit breaker. This last circuit breaker is, in turn, tripped substantially instantaneously at short circuit currents of values substantially equal to or below the maximum interrupting capacity of the circuit breaker adjacent it toward the load.

In sequential tripping systems heretofore employed, the time separation between the various circuit breakers in the system has been effected by the provision of relays which have been set to various time delays and which, on operation, energize the shunt trip coils. Such systems are either very expensive and involved or can only provide sequential operation by timed intervals in the range of seconds since it is necessary in such a system that the relay first be energized sufficiently long to pull up its armature to close its contacts. When the armature has been moved to the energized position, and then only, does it energize the shunt trip coil which in turn must operate a second armature to operate the trip mechanism. Where instantaneous features were added, as was often the case, all circuit breakers in the sequence would open thus losing continuity of service.

I have discovered that I can secure sequential tripping of circuit breakers in a power system not only in the overload current ranges such as may occur in motor starting circuits, but also in the range of short circuit currents where the tripping must be substantially instantaneous.

This I effect by providing overload devices having an inverse time ratio which may substantially simulate the heating conditions of a load such as a motor to provide a time delay trip for the protection of such a load. This is followed by a quick trip protection at greater overload conditions such as at two to ten times the overload value of the particular breakers with a short inverse time or definite minimum time characteristic. In addition, a more definite ratio can be obtained by saturation of the magnetic circuit in the overload device.

Finally there is provided an instantaneous trip mechanism individual to each of said breakers. This latter is so arranged with respect to each of the other circuit breaker trip curves that each of the larger breakers (in a cascaded system) has substantially the same instantaneous tripping time as the next smaller breaker at the interrupting capacity of that smaller breaker.

At less than this interrupting capacity each of the quick trip mechanisms, however, has a slightly slower tripping operation measurable in terms of a few cycles than the next smaller circuit breaker so that sequential tripping is still effected in such a short circuit current range close to maximum interrupting capacity of the breakers of the system.

A primary object of my invention, therefore, is the provision of a novel tripping device for a circuit breaker which will be selectively responsive at different speeds to different types of overload and short circuit.

Another object of my invention is the provision of a time delay device for a circuit breaker tripping mechanism wherein a single unitary time delay element may be provided with a plurality of independent adjustments for various time delays under different loads.

Still another object of my invention is the provision of a novel time delay device for the tripping elements of a circuit breaker which will adapt the circuit breaker for use in a sequential tripping system of the character above set forth.

Another object of my invention is the provision of a time delay device arranged to have characteristic curves for protecting normal overloads, such as starting current in motor circuits, while at the same time it has other characteristic curves for protection against various more excessive loads up to and including short circuits.

Another object of my invention is the provision of a novel time delay device for use in connection with tripping elements of circuit breakers arranged in a sequential tripping system in which both long time delay periods and quick trip operating periods are obtainable.

In a preferred form of my invention, the time delay device comprises essentially the utlization of a pair of armatures, one of which will be substantially non-responsive to ordinary low current overloads but which will be responsive with a time delay to heavy overloads; the other armature being responsive to low current overloads with an appropriate time delay, but being so adjusted that it will be free of its time delay device and respond instantaneously on short circuit currents.

The foregoing and many other objects of my invention will become apparent from the following description and drawings in which.

Figures 1, 2:
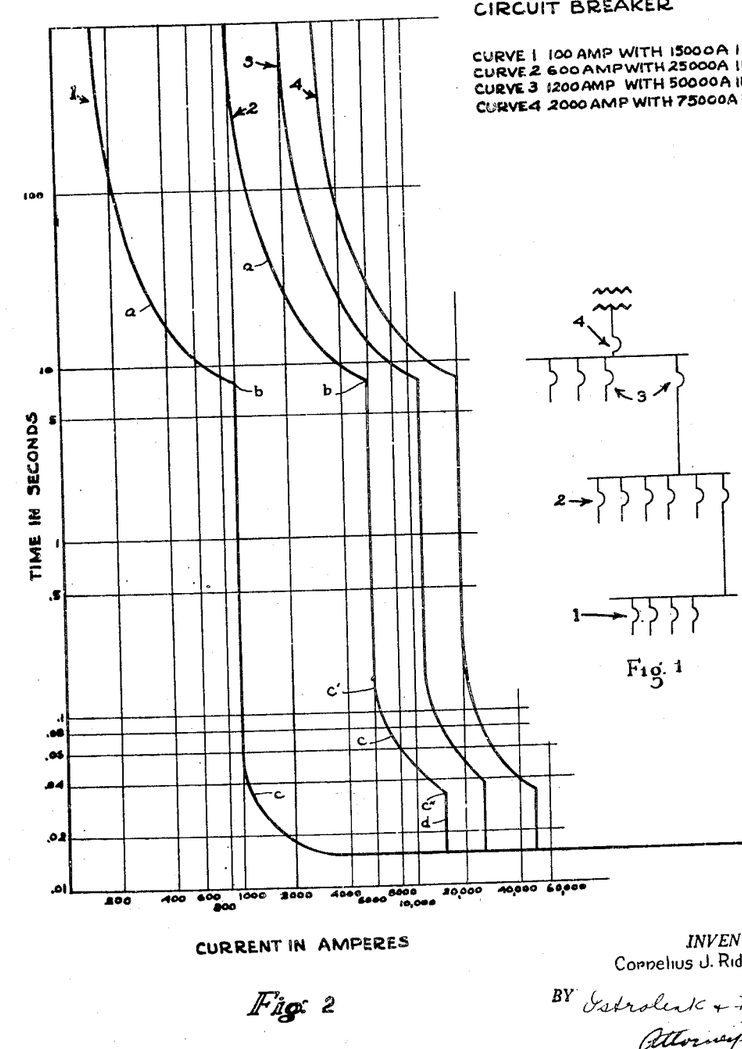
Figure 1 is a schematic diagram of a group of circuit breakers in a typical distribution system.
Figure 2 is a graph showing the tripping characteristics of each of the circuit breakers in the group.
Figure 3:
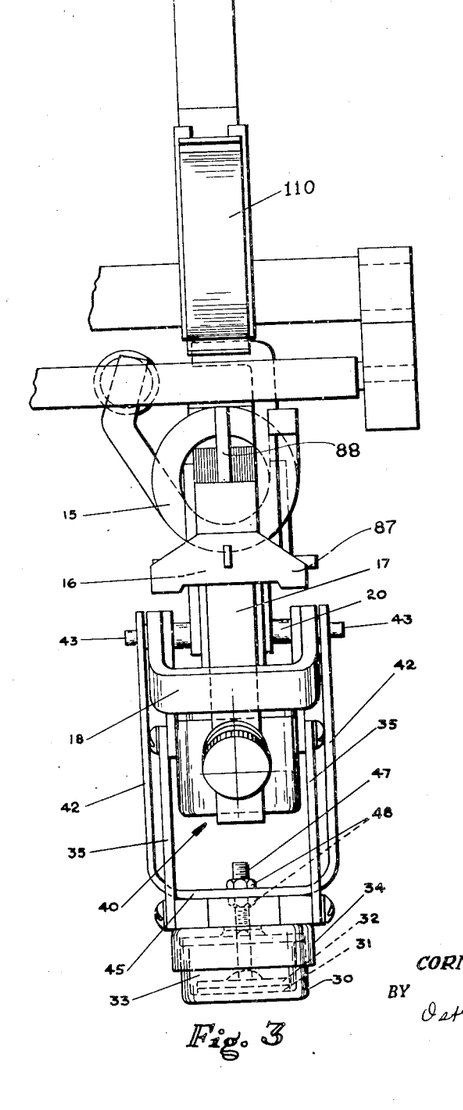
Figure 3 is a front view of my novel time delay device for the armature of a circuit breaker.
Figure 4:
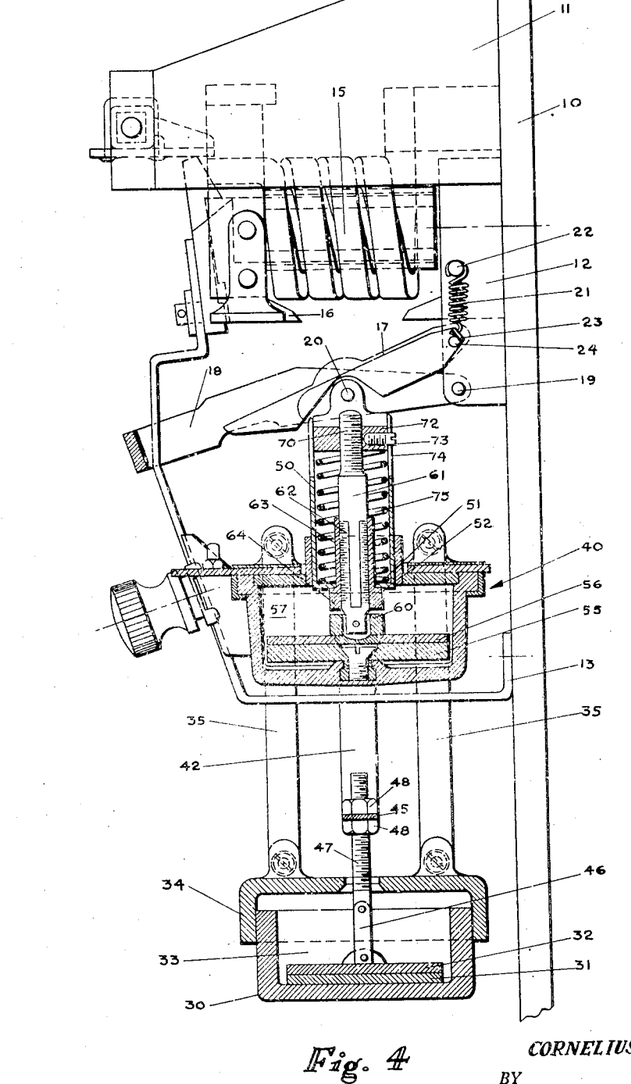
Figure 4 is a side view partly in cross-section of the device of Figure 3.

In Figures 3 and 4 I have shown my specific novel time delay device which is specifically adapted to carry out the operations above described with respect to the simple distribution system of Figure 1, and the curves of Figure 2.

Figures 3 and 4 show a trip mechanism which may be connected to trip open a suitable circuit breaker of the type, for instance, shown in Patent Nos. 2,348,228 and 2,375,328. The circuit breaker panel 10 carries a suitable frame comprising sections 11, 12 and 13 secured thereto in any appropriate manner, which frame in turn supports a series trip coil 15 which energizes the magnet 16.

Armature 18 is essentially U-shaped and is pivotally mounted at 19 for cooperation with the magnet 16.

Armature 17 is pivotally mounted on the pivot pin 24 and is connected to the upper end of the time delay device, hereinafter described by the pin 20.

The tension spring 21, one end of which is carried by the pin 22 of frame section 12, and the other end of which hooks into an extension 23 of armature 17, serves to prevent the armature 17 from chattering when the breaker is used on alternating systems.

Armature 17 is provided with a time delay to prevent the tripping of the circuit breaker under normal overloads of the order of two to ten times normal, when such overloads extend only for a relatively short period of time (7 to 100 seconds).

Armature 17, as will be noted, is well within the field of the magnet 16 and is readily attracted thereby. The time delay device, however, ensures appropriate calibrated operation. Armature 18 is a U-shaped member which does not extend in the principal field of the magnet 16, and accordingly, the magnet must be additionally energized by a substantial overload before the armature 18 is attracted.

A time delay, hereinafter described, is provided for the armature 18 so that although the armature 18 is arranged to respond to substantial overloads (for instance, of more than ten times normal), it will do so with a slight time delay. Armature 18 is connected to its time delay, however, in such a manner that when the maximum interrupting capacity of the circuit breaker is reached, i. e., at short circuits, the attraction on the armature 18 will be so great as to release it from its time delay device so that it will be instantaneous.

Summarizing, armature 17 is subject to a time delay which makes it respond relatively slowly for overloads which may normally occur for a short period of time. Armature 18 will be attracted sufficiently to trip the breaker only under substantial overloads (less than short circuits) but is provided with a short time delay.

Armature 18 is, however, arranged that when short circuits occur, it will be released from its time delay and will be instantaneous.

Accordingly, the trip unit here described will trip the circuit breaker (1) with a relatively long time delay for so-called normal overloads; (2) with a relatively short time delay for heavy overloads (less than short circuits); and (3) instantaneously at short circuits.

Accordingly, referring back to curve 2 of Figure 2, the long time delay on armature 17 corresponds to the time delay shown at section *a* of curve 2. The short time delay for armature 18 has an operation corresponding to section *c* of curve 2. The instantaneous operation of armature 17, when the attraction is sufficiently great to release it from the time delay, corresponds to section *d* of curve 2.

The time delay for armature 18 comprises the dashpot 34 having the stationary sucker disc 31 and the movable sucker disc 32 within the oil chamber 33 of the dashpot 34. Dashpot 34 is rigidly supported by the straps 35, 35 which are at their upper ends secured to the stationary dashpot 40 which serves as the time delay for armature 17.

The armature 18 has secured thereto a strap 42, the ends of which are carried on the pins 43 extending from the sides of armature 18. Strap 42 extends down adjacent the top wall of the dashpot 34, and is completed by a bridging piece 45. Link 46, connected to the movable sucker disc 32, is at its upper end connected to the threaded bolt 47 which passes through an opening in the connecting piece 45 of the strap 42 and is adjustably secured thereto by the nuts 48, 48. Accordingly, armature 18 is thus connected by the strap 42 to the movable sucker disc 32 of the dashpot 34. The upper movement of the armature 18 is thus delayed by the time required for the movable sucker disc 32 to break loose from the stationary sucker disc 31. This time delay is relatively short, but as above pointed out, is not instantaneous; it corresponds to section *c* of curve 2 of Figure 2.

As previously pointed out, the armature 18 is so arranged that a substantial overload is required to attract it sufficiently to result in a tripping operation. This substantial attraction, however, is subject to the very short time delay of the order of more than .016 second and less than fifteen seconds (as determined from section *c* of curve 2 of Figure 2).

The armature 17 is connected by the pin 20 to the tube 50. Tube 50 is a hollow unit having a relatively narrow opening 51 at the bottom; opening 51 being sealed by an annular ledge 52 formed by a re-entrant flange of the tube 50.

The dashpot 40, which is securely and stationarily mounted in the frame piece 13 is provided with a stationary sucker disc 55 and a movable sucker disc 56. The sucker discs 55 and 56 are in the oil chamber 57 of the dashpot 40. Movable sucker disc 56 is connected by the pin 60 to the threaded rod 61.

Rod 61 is threaded at its lower end at 62 to receive the threaded sleeve 63 having the lower annular flange 64 which bears against the underside of flange 52. The upper end of the rod 61 has a threaded extension 70 on which the nut 72 is threaded. Nut 72 may be rotated up and down on the rod 61; and when positioned in appropriately calibrated position, it may be locked against the rotation by insertion of the lock screw 73 through the slot 74 in the side of the tube into an appropriate radial tapped opening (or plurality of openings) in the nut 72.

A relatively heavy compression spring 75 is captured between the nut 72 and the re-entrant flange 52 at the lower end of the tube 50. The compression spring 75 is so arranged that it is ordinarily not compressible under the pressure exerted thereon by any overload less than a short circuit current or less than the maximum interrupting capacity of the circuit breaker. Accordingly for ordinary overloads where a time delay is desired, the spring 75 is to be treated as a relatively solid incompressible member.

When, therefore, the armature 17 is attracted by an ordinary overload of the type described (corresponding say, to section *a* of curve 2 of Figure 2), the armature 17 will pull on the pin 20 and will thus pull up on the tube 50. The lower flange 52 of the tube 50 will be pulled up pushing up on the spring 75 which in turn will push up on the nut 72. Nut 72 will pull the rod 61 up and thus, through pin 60, will pull up the movable sucker disc 56, and an ordinary time delay will occur.

When, however, a short circuit condition or the maximum interrupting capacity of the circuit breaker is reached so that the spring 75 can be compressed, thereupon the armature 17 will, through pin 20, pull up on the tube 50. The flange 52 of the tube 50 will pull up the lower end of spring 75 compressing it against the nut 72 thus permitting the tube 50 to rise and permitting the armature 17 to rise to tripping position, while rod 61 and sucker disc 56 remain stationary. Therefore, even though the movable sucker disc 56 will, under low overload conditions, interpose a time delay, this time delay is mechanically by-passed by the compression of the spring 75 by reason of the force on the armature in response to short circuit current requiring instantaneous tripping. This last condition in which the spring 75 is compressed to mechanically by-pass the time delay on armature 17 affected by dashpot 40, corresponds to section *d* of curve 2 of Figure 2.

By the means herein described, therefore, a relatively long time delay is interposed by dashpot 40 in the movement of armature 17 under relatively low overloads so that tripping will not occur if these relatively low overloads continue for only a relatively short time (not more than 7 to 100 seconds depending on the degree of the relatively low overload). When a heavy overload (less than short circuit) occurs, armature 18 will be attracted, but this is subject to a time delay of the order of .016 to .015 second, depending on the degree of the heavy overload. When, however, a short circuit condition occurs, the compression of spring 75 permits the armature 17 to mechanically by-pass the dashpot 40 and its movable sucker disc 56 so that the armature 17 may respond instantaneously within a time interval of the order of .016 second.

The utilization of my novel trip unit, therefore, in circuit breakers ensures appropriate sequential operation in a cascade system of the type exemplified in Figure 1. The time delays of dashpot 40 and dashpot 34 may be adjusted for different time delays as determined by the position of the circuit breaker in the cascade system. Likewise, the armatures 17 and 18 may be restrained in any suitable well-known manner as, for instance, by appropriate tension springs to calibrate these armatures for the particular relative loads to which they are to respond. Likewise, the spring 75 may be adjusted by adjustment of nut 72 to calibrate the circuit breaker for instantaneous operation in accordance with the particular place in the cascade system which the circuit breaker occupies.

The various constructions above described are given by way of example only and many different time delay relationships for relatively low overloads, heavy overloads, and short circuits may be utilized.

Figure 5:
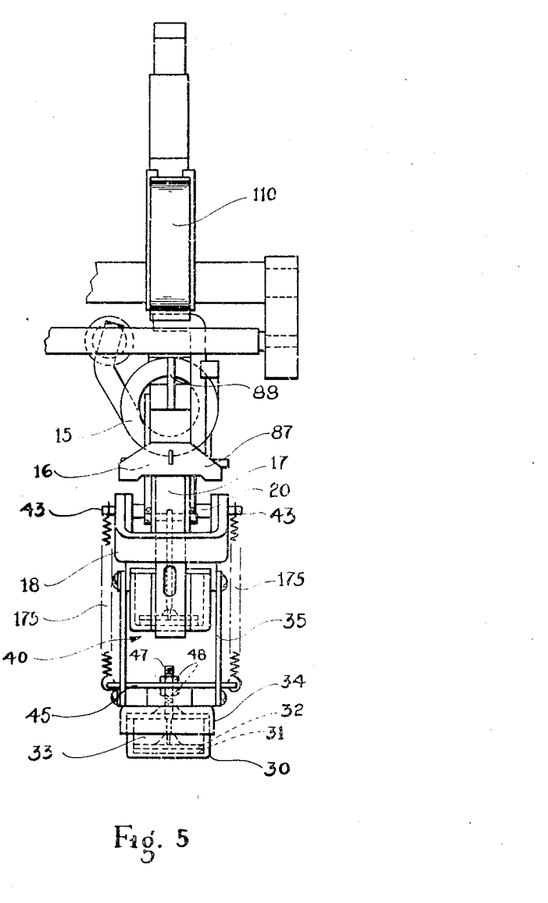
Figure 5 is a front view of a slightly modified form of my novel time delay device corresponding to the front view of Figure 3.

Thus, in Figure 5 I have shown the manner in which the instantaneous trip spring may be utilized on the quick trip armature 18 rather than on the time delayed armature 17. In this case the cross pin 43 through the quick trip armature 18 is connected to the cross bar 45 at the time delay 34 by the tension springs 175, 175 at each side.

The connection between the armature 17 and its dashpot 40 is a rigid one in Figure 5, omitting the spring 75 of Figure 4. Accordingly the long time delayed trip occurs on the attraction of armature 17; the short time delay or quick trip occurs on the attraction of armature 18; and the instantaneous trip occurs when armature 18 is attracted with such force as to extend the springs 175 so that armature 18 may move free of the time delay mechanism 34.

Figure 6:
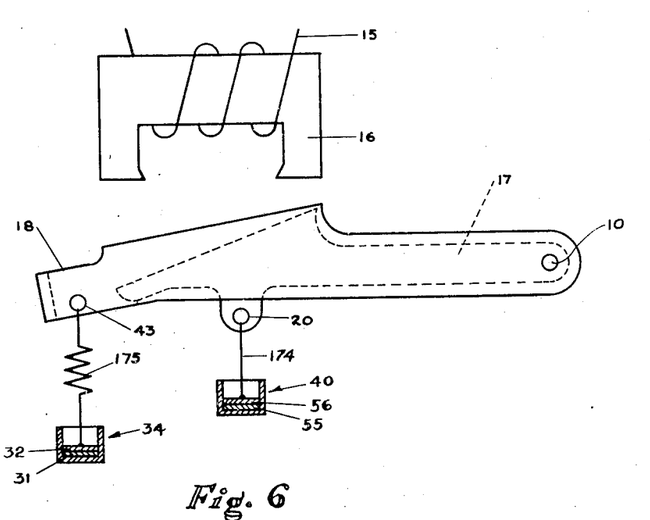
Figure 6 is a schematic view of the operation of my novel time delay corresponding to the modified form of Figure 5.

This modified form is illustrated in Figure 6 where it is seen that the armature 17 is connected at its pivot 10 to a rod 174 which is directly connected to the sucker disc 56 of the dashpot 40 without the intervention of a spring, such as the spring 75 of Figure 4; while the quick trip armature 18 is connected to its dashpot 34 through the spring 175 which connects it to the sucker disc 32 of the dashpot.

It will thus be seen from the schematic view of Figure 6 that the armature 17 which is directly within the greatest portion of the magnetic field of magnet 16 will first be attracted, the dashpot 40 giving a long time delay. When the current in coil 15 rises to increase the magnet field generated by the magnet 16, the quick trip armature 18 will rise, held back by the relatively shorter time delay of dashpot 34.

On short circuit currents or extremely heavy loads, armature 18 will be attracted with sufficient force to extend the spring 175 to permit instantaneous trip, that is, to permit the armature 18 to move independently of its time delay dashpot 34.

Figure 7:
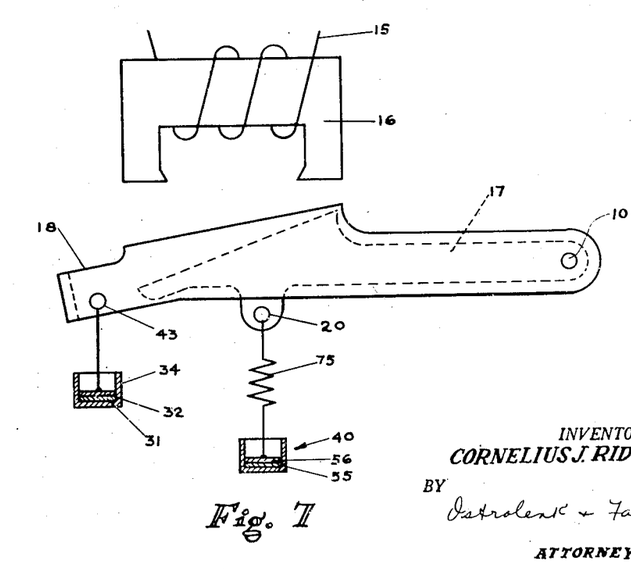
Figure 7 is a schematic view of my novel time delay corresponding to the form of Figures 3 and 4.

The Figure 7 schematic view shows the arrangement previously described in connection with Figures 3 and 4, in which the short time delay or quick trip armature 18 is rigidly connected to its dashpot 34. The long time delay armature 17 is connected to its long time delay dashpot 40 by the spring 75. On extremely heavy currents, such as short circuits, the spring 75 is extended (or rather compressed with respect to the specific form of Figures 3 and 4) so that the armature 17 may move free of the dashpot 40.

Figure 8:
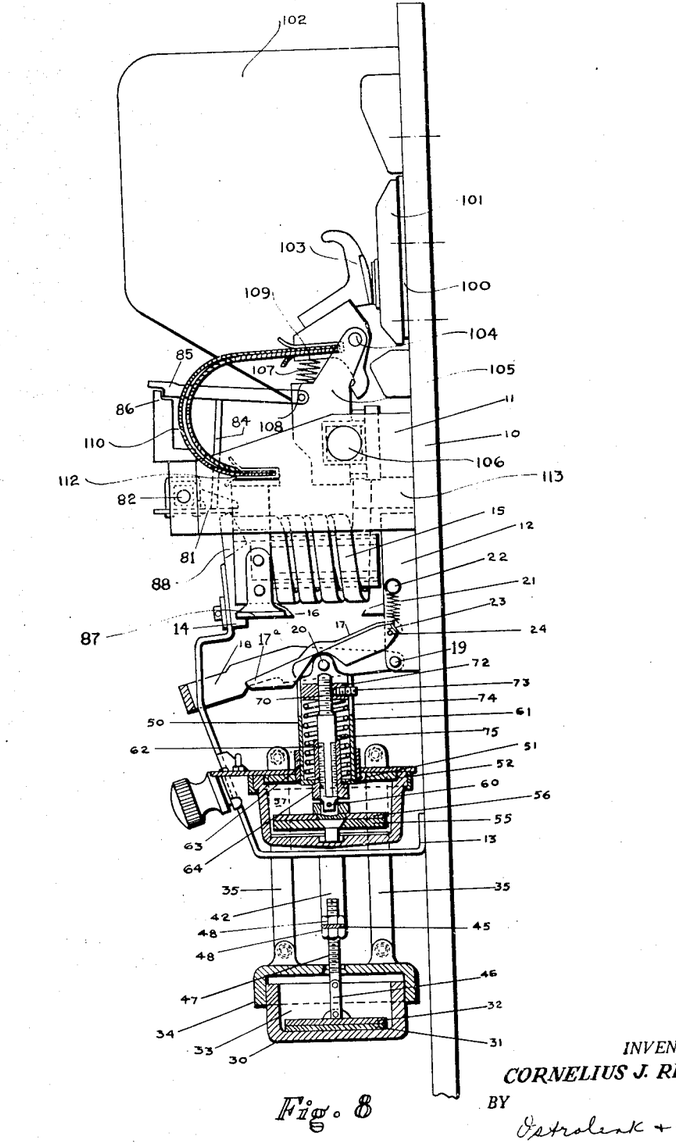
Figure 8 is a side view of a complete circuit breaker showing the manner in which the time delay of Figures 3 and 4 is mounted therein.

In Figure 8 I have shown the manner in which my novel time delay mechanism may readily be mounted in a circuit breaker. The panel 10 carries a main stationary contact 100 mounted on a stationary arcing horn 101 within the arc chute 102. The main movable contact 103 is essentially an L-shaped member pivotally mounted at 104 on the contact arm 105, which contact arm 105 is in turn mounted on the operating shaft 106. Contact pressure of the movable contact 103 against the stationary contact 100 is obtained by the compression spring 107 between the ledge 108 of contact arm 105 and the surface 109 of the movable contact member.

A pigtail 110 connects the movable contact 103 to the terminal 112 of the series trip coil 15, the opposite end of the series trip coil being connected to the terminal 113. Back connection studs or other suitable connecting means are provided to the upper stationary contact 100 and the lower terminal block 113.

When the armature 17 is attracted by the energized magnet 16, the end portion 17a strikes the movable trip member 88 which is fastened to the trip extension piece 87. Movable trip member 88 in turn strikes the tripper bar 81 which rotates counterclockwise on pivot 82. Rotation of tripper bar 81 causes the link 84 to lift the latch lock 85 from its keeper 86 and thus permits the movable contact assembly 103, 104, 105 to rotate counterclockwise about its pivot 106 and open the circuit breaker.

Extension piece 87 is designed so that armature 18 will affect the movable trip member 88 when it is attracted by the magnet 16 in response to short circuit currents.

In the foregoing I have described my invention only in connection with a specific physical embodiment thereof. Since many variations and modifications of my invention will now be obvious to those skilled in the art, I prefer to be bound not by the specific disclosures herein but only by the appended claims.

I claim:

1. In a circuit breaker, an electromagnet responsive to fault currents flowing through said circuit breaker, a pair of armatures, one of said armatures being mounted in the magnetic field to be responsive to relatively low fault currents, a time delay device connected to said armature for delaying the operation of said armature for a predetermined time interval, the second of said armatures extending beyond the pole face and electric field of said electromagnet to respond only to fault currents of greater value than the fault currents to which said first mentioned armature responds, and a time delay device connected to said second armature for delaying the operation of said second armature for shorter intervals than said first armature, one of said connections being a resilient member which is a rigid connection for currents below the current value to which the second-mentioned armature responds and is a flexible connection for currents above the current value to which the second-mentioned armature responds.

2. In a time delay mechanism for a circuit breaker, a pair of armatures mounted for variably predetermined movements, means for effecting the movement of said armatures in one direction and means for variably retarding the movement of said armatures in said direction comprising time delay members individual to each of said armatures and having individual and differing time current characteristics, a connection from one of said time delay members to its associated armature for controlling its time of operation, and a resilient connection between the other of said armatures and its time delay member for enabling instantaneous operation of said armature in response to predetermined fault currents, said resilient connection yielding to permit said last mentioned armature to move free of its time delay when said armature is attracted by said armature moving means with a predetermined force, one of said connections being a resilient member which is a rigid connection for currents below the current value to which the second-mentioned armature responds and is a flexible connection for currents above the current value to which the second-mentioned armature responds.

3. Means for variably retarding the movement in one direction of a pair of armatures of a time delay electromagnetic device upon variable predetermined energization thereof comprising one of said armatures being attracted to the electromagnetic device when the current through the electromagnetic device reaches a predetermined value, the other of said armatures being attracted to the electromagnetic device when the current through the electromagnetic device reaches a predetermined greater value, time delay member individual to each of said armatures and having individual and differing time current characteristics, a connection from one of said time delay members to and controlling the time of operation of its individual armature, and a resilient connection between the other one of the armatures and its time delay member for enabling instantaneous operation of said armature in response to predetermined fault currents.

4. In a time delay mechanism for a circuit breaker trip device including a pair of armatures; time delay members individual to each of said armatures and having individual and differing time current characteristics, a connection from each of said time delays to its associated armature for individually controlling the time of operation of its individual armature, one of said time delay members delaying the operation of its associated armature for currents up to twelve times the normal load capacity of the circuit breaker and the other of said time delay members delaying the operation of its associated armature for currents from twelve times normal to the interrupting capacity of the circuit breaker, and a resilient connection between at least one of the armatures and its time delay means for enabling operation of its associated armature independent of the time delay in response to predetermined fault currents.

5. In a time delay mechanism for a circuit breaker trip device including a first armature operable in response to a predetermined force and a second armature operable only in response to more than the predetermined force, a first time delay means connected to said first armature for delaying the operation of said first armature a predetermined time, a second time delay means connected to said second armature providing a relatively shorter time delay of said second armature than said first time delay, each of said time delays having individual and differing time current characteristics, and a resilient member in the connection between the first armature and its time delay to permit said armature to move free of its time delay when attracted by more than the predetermined force.

CORNELIUS J. RIDGLEY.

REFERENCES CITED

The following references are of record in the file of this patent:

UNITED STATES PATENTS

| Number | Name | Date |
| --- | --- | --- |
| 863,185 | Jeffries | Aug. 13, 1907 |
| 1,123,288 | Hellmund | Jan. 5, 1915 |
| 1,154,359 | Basch | Sept. 21, 1915 |
| 1,696,611 | McDonald | Dec. 25, 1928 |
| 1,764,382 | Ashbaugh | June 17, 1930 |
| 1,800,256 | Keller | Apr. 14, 1931 |
| 1,810,591 | Atwood | June 16, 1931 |
| 1,840,518 | May | Jan. 12, 1932 |
| 2,340,973 | May | Feb. 8, 1944 |
| 2,393,736 | Bennett et al. | Jan. 29, 1946 |
| 2,439,165 | Graves | Apr. 6, 1948 |